Aug. 24, 1965      O. ZAUNER      3,202,495
APPARATUS FOR FORMING MOUTH PORTIONS OF
SMALL GLASS CONTAINERS
Filed April 23, 1962      4 Sheets-Sheet 1

INVENTOR.
OTTO ZAUNER
BY
E. J. Holler &
W. A. Schaich

Aug. 24, 1965   O. ZAUNER   3,202,495
APPARATUS FOR FORMING MOUTH PORTIONS OF
SMALL GLASS CONTAINERS
Filed April 23, 1962   4 Sheets-Sheet 3

INVENTOR.
OTTO ZAUNER
BY
E. J. Holler &
W. A. Schaich

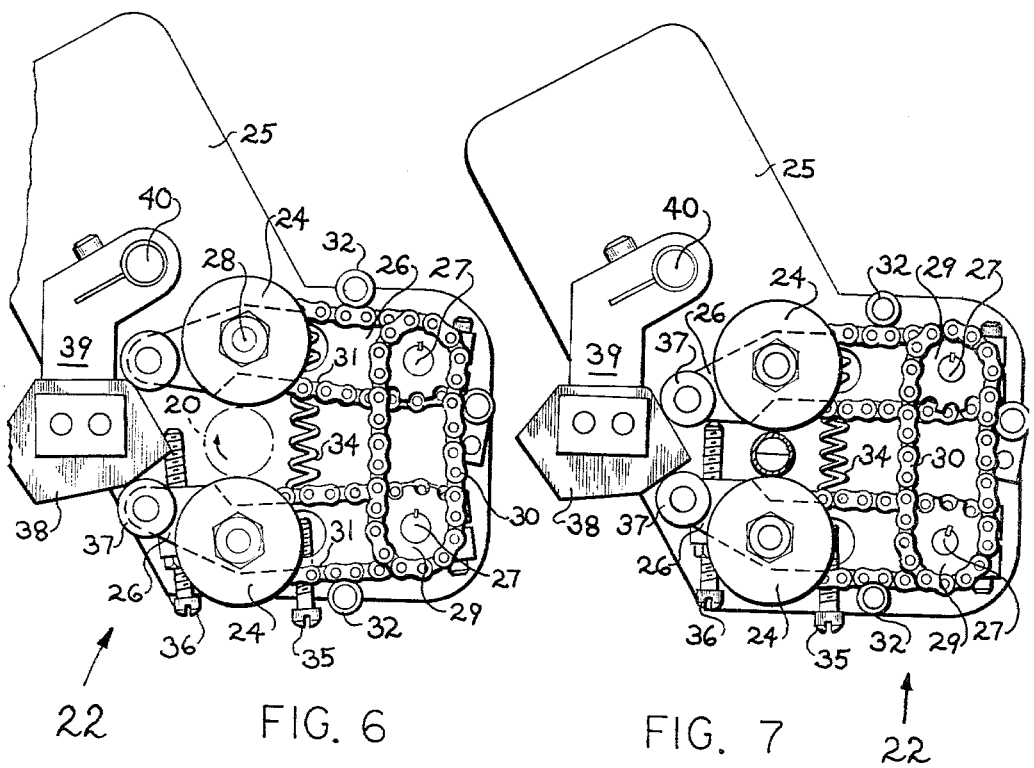
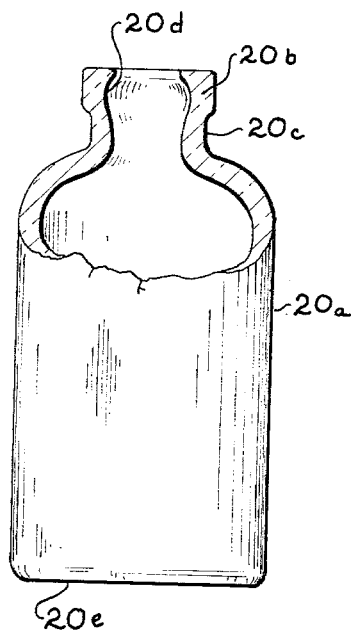

United States Patent Office 3,202,495
Patented Aug. 24, 1965

3,202,495
APPARATUS FOR FORMING MOUTH PORTIONS
OF SMALL GLASS CONTAINERS
Otto Zauner, Vineland, N.J., assignor, by mesne assignments, to Owens-Illinois Glass Company, Toledo, Ohio, a corporation of Ohio
Filed Apr. 23, 1962, Ser. No. 189,544
4 Claims. (Cl. 65—277)

The present invention relates to method and apparatus for forming small glass bottles, vials, and the like, and more particularly to accurately shaping the neck and mouth portion of such glass containers to provide an internal contour having a reentrant configuration, for example.

The subject invention generally pertains to improved apparatus for use in conjunction for one or more types of forming machines adapted to manufacture small glass bottles or vials from glass tubing. Such machine may be constructed in accordance with known forming apparatus and especially rotary machines adapted to manufacture small glass bottles, vials or tubes for laboratory use, as well as to contain pharmaceutical products and medicinal preparations.

One type of such rotary machine which has been utilized previously in the manufacture of a plurality of small glass containers from lengthy sections of glass tubing is described and illustrated in U.S. Patent No. 2,935,819 issued to Jakob Dichter on May 10, 1960, entitled "Machine for the Manufacture of Small Glass Bottles or the Like from Glass Tubes."

The machine described in the referenced patent includes two groups of workpiece holders which when viewed in plan move through two adjacently disposed and mutually contacting circular paths each containing a series of work stations and having a common contact point at an overlapping region. A partially formed separated workpiece consisting of a glass tube which previously has been carried by a holder of the first group is retained by a holder of the second group to form the unfinished end of the tube stock with a closed contour to facilitate subsequent completion of each individual container.

The machine and method described in the aforesaid Dichter patent are utilized to form small glass containers having regular or smoothly-contoured mouth openings of suitable dimensions. Normally the mouth portion is thickened to form a uniformly beaded or flanged finish.

According to the Dichter patent disclosure, when it is desired to produce a beaded, flanged or screw-threaded finish on the outer wall of the neck, one or more shaping tools such as a roller having a flange-forming contour on its shaping surfaces is brought to bear against the open end portion of the workpiece. Also, a pair of rotatable circular forming rolls may be employed to form the flange finish. The forming rolls are frictionally rotated by physical contact with the driven glass tube as disclosed by Dichter. Alternately, the pair of forming rolls may be positively driven in synchronism with the glass tube and each other in accordance with my pending patent application, Serial No. 56,975, filed September 19, 1960, entitled "Method and Apparatus for Forming Mouth Portions of Small Glass Bottles." Such apparatus and procedure are particularly suitable for forming screw-threaded external contours of precise dimensions.

At several of the work stations of Dichter movable mandrels having collars are utilized to shape the glass tube internally during constriction of the tube by one or more forming rollers. The mandrels of Dichter constitute solid cylindrical members having a tapered upper end and an enlarged collar at an intermediate lower region to produce essentially uniform cylindrical internal surfaces on the open-end portion of the constricted glass tube. The patentee Dichter also discloses forming an internally-threaded end portion by the solid shaping mandrel possessing a threaded contour on its threaded surface about which the glass is brought into engaging contact. The solid mandrel is then backed out of the tube by relative rotation. There is no teaching in his disclosure of forming a precisely-contoured enlarged internal contour such as a so-called "blow-back" finish. Such finish is particularly desirable for positively seating stoppers comprised of resilient material such as rubber or synthetic plastic. Containers having such precisely-formed "blow-back" internal finish, when sealed with a suitable stopper, are capable of withstanding autoclaving and subsequent extreme variation in atmospheric conditions without loss of seal.

Accordingly, it is an object of the present invention to provide method and apparatus for accurately forming the neck and mouth portions of a small glass container having a desired internal configuration to obtain effective sealing.

Another object of this invention is to provide apparatus for shaping the open-end portion of a tubular glass workpiece with a precisely-contoured readily reproducible reentrant internal contour known in the art as a so-called "blow-back" finish.

Another object of this invention is to provide glass working apparatus which consists of an expansible forming mandrel utilizable in conjunction with known forming machines and apparatus to facilitate efficient formation of a reentrant internal configuration in small glass containers which apparatus is readily applicable for use in forming a plurality of such containers from lengthy tubular glass blanks of varying diameter.

A further object of this invention is to provide a method of forming reentrant internal surfaces within the open end portion of small glass containers by a self-centering expansible forming mandrel adapted to controlled expansion and contraction to permit forming the internal surfaces with precisely-duplicatable contours and dimensions.

The specific nature of this invention, as well as other objects and advantages will become apparent to those skilled in the art from the following detailed description taken in conjunction with the annexed sheets of drawings on which, by way of preferred example only, are illustrated the preferred embodiments of the invention.

On the accompanying drawings:

FIG. 6 is an enlarged plan view of the individual work station taken on the line 6—6 of FIG. 2 showing the external mouth forming elements in open arrangement;

FIG. 7 is a view similar to FIG. 6 showing the external mouth forming elements in closed arrangement; and FIG. 8 is an enlarged elevational view partly in section of a glass bottle fabricated in accordance with the present invention.

The subject apparatus as illustrated in a preferred embodiment is especially suitable for tooling the internal and external surfaces of mouth and neck portions of small glass bottle blanks during their temporary retention at an individual work station while each blank is rotated axially, the open end portion of each blank being acted upon by the method and combined apparatus which comprise my invention. The invention is equally applicable to tooling larger or smaller surfaces of a wide variation of different types of tubular glass articles or blanks having different diameters and wall thicknesses, and is not to be considered as limited to tooling only relatively small size glass bottles or vials except as defined by the scope of the appended claims.

Figure 1:
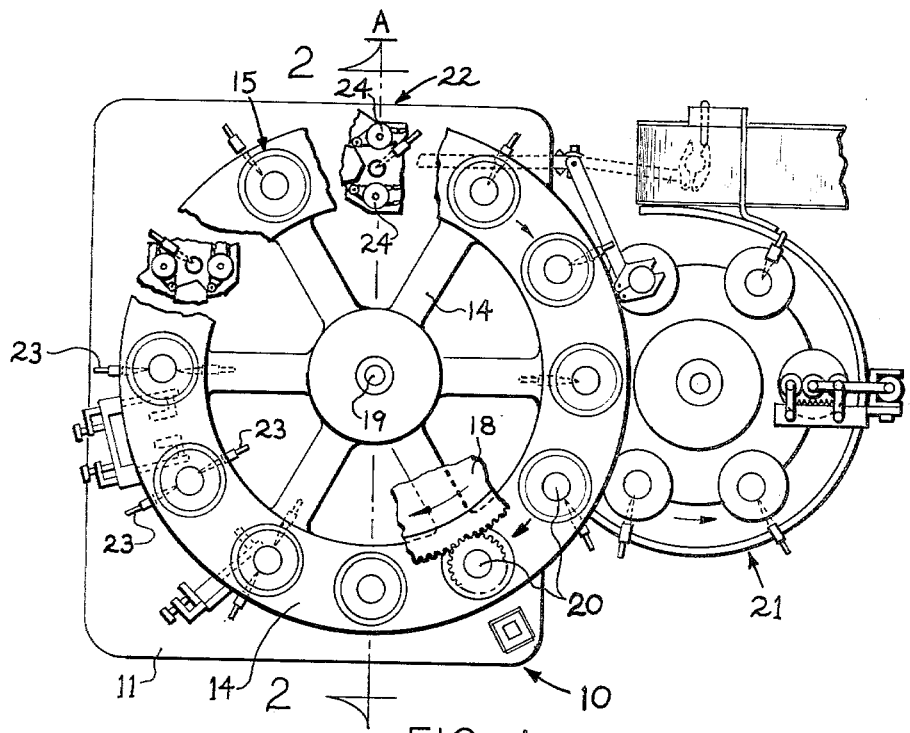
FIG. 1 is a top plan view of a glass forming machine embodying the present invention with portions thereof shown cut away.
Figure 2:
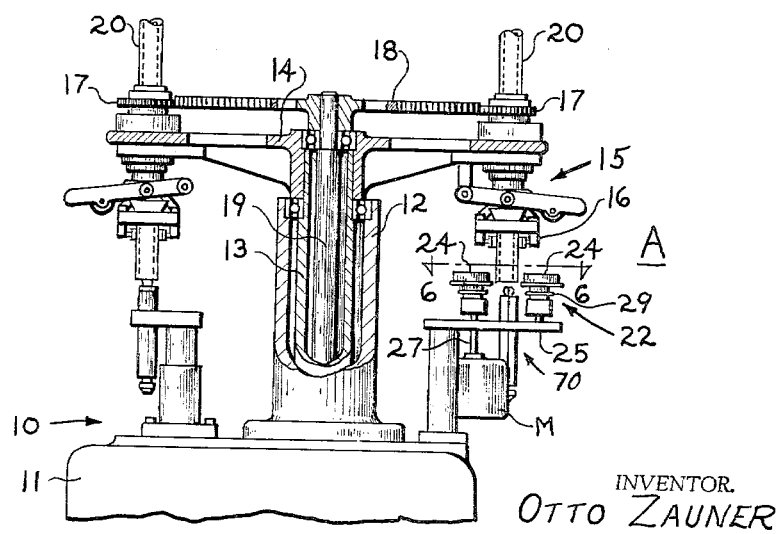
FIG. 2 is a side elevational view partially in vertical section taken along the line 2—2 of FIG. 1.

As illustrated in FIGS. 1 and 2 of the drawings, the forming machine 10 consists generally of a stationary base member 11 and an upright pedestal bearing 12 in which is journaled a hollow shaft 13 which extends downwardly into the machine base. The upper end of hollow shaft 13 supports a horizontally-disposed rotary support ring 14 which carries an equi-spaced series of tube stock retaining mechanisms 15 each having an individual chuck 16. Each of the chucks 16 is rotatable and is rotated continuously in the same direction and in synchronism by a spur gear 17 connected thereto at an upper region of retaining mechanism 15. A large wheel 18, having the perimetrical contour of a large gear wheel, is rotatably journaled within an upper region of support ring 14 and connects with a vertical drive shaft 19. Shaft 19 extends downwardly through hollow shaft 13 into the machine base to drive the series of chuck rotating gears 17. Thus, the plurality of chucks 16 can be driven at any desired speed of axial rotation independently of the indexing movement of support ring 14 through a series of successive work stations.

The subject glass containers or bottles are preferably formed from lengthy sections of glass tubing 20 which are retained by chucks 16 in vertical relation during formation of the lower open end portion of each workpiece with which the present invention is specifically concerned.

Following completion of the open end forming operation each chuck mechanism can be individually released to prevent rotation and to permit separation of the tube stock at a prescribed intermediate region and final forming of the closed end portion of each container. Final forming of each container is accomplished during their conveyance around the second series of work stations designated by the numeral 21 in FIG. 1.

At the work station A shown at an upper region of FIG. 1 and on the right-hand side of FIG. 2, the lower end portion of the tube stock or workpiece 20 having its lower end portion in heat-softened workable condition is brought into engagement with the end forming apparatus designated by the numeral 22 constructed and operated in accordance with my invention. The lower end portion of each tube 20 is open and passed through a series of previous stations at which pairs of gas-fired burners 23 heat the end portion into workable thermoplastic condition.

The apparatus briefly stated consists of a pair of rotatable circular forming dies 24 which are mounted on a base member 25 disposed in a plane normal to the tubing axis. The pair of dies 24 are aligned normal to the direction of movement of tubular workpiece 20 toward and away from work station A in a clockwise direction as shown in FIG. 1. Forming dies 24 are preferably disposed in horizontally aligned relation on a radial line extending from the center of the machine.

As shown in FIGS. 6 and 7, base plate 25 extends horizontally beneath and in proximity to the lower end of tubing 20. A pair of movable arms 26 are mounted in pivotal relation on base plate 25 with an upright shaft 27 journaled in and connecting each arm and the base constituting the pivot point of the former. The pair of circular rotatable forming dies 24 is mounted on the cantilevered free ends of arms 26 with one die individual to each arm. Each die 24 is supported by a short upright shaft 28 mounted in a suitable bearing to permit its rotation. A pair of similar sprockets 29 is fixedly connected to the upright rotary shafts 27 carrying each arm with the sprockets having an endless chain 30 extending therearound. Also connected to each shaft 27 is another sprocket disposed in parallel alignment with a die driving sprocket mounted on die retention shaft 28. An endless chain 31 extends around each die driving sprocket and the second sprocket on shaft 27. Thus, the pair of forming dies 24 are interconnected by the pairs of individual driving chains 31 coextensive with each arm 26 and common driving chain 30 extending between mounting shafts 27 of the pivoted arms. Idler rollers 32 are mounted to bear against individual chains 31 to maintain the same in proper tension and adjustment. Alternatively, the several forming dies 24 are not positively driven by the individual driving chains which are removed and the circular dies are permitted to rotate freely.

As shown in FIG. 2, one shaft 27 extends downwardly through base plate 25 and is supported in a suitable bearing housing for interconnection with suitable driving means such as electric motor M. The driving means is operated in timed synchronism with other operative elements of the machine or a common source employed to power the machine. Thus, dies 24 are rotated at the same peripheral speed of rotation in the same direction and in synchronism with tube stock 20 or, alternately, the dies are permitted to rotate freely.

Figure 3:
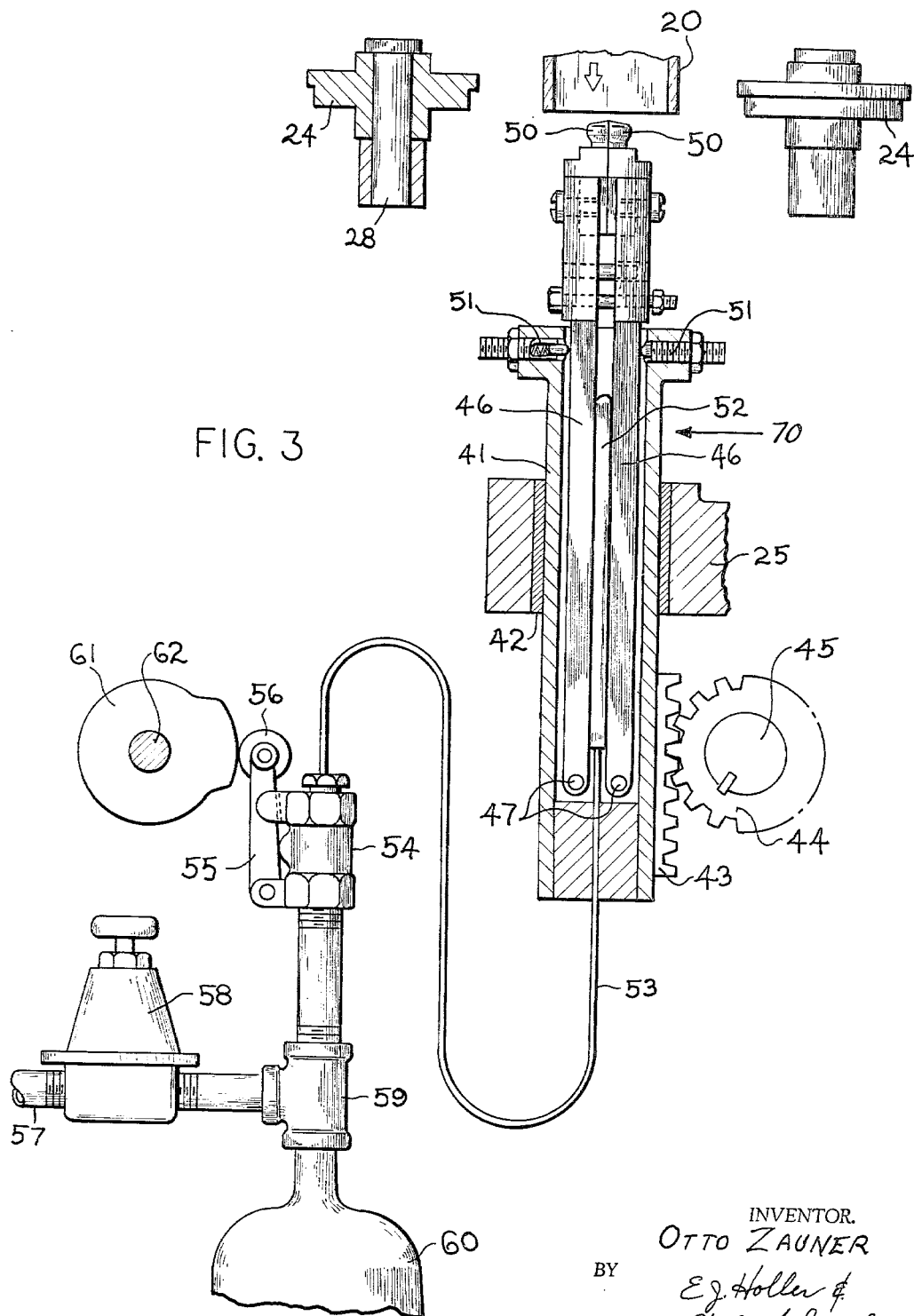
FIG. 3 is an enlarged vertical sectional view of the mouth shaping apparatus at an individual work station shown in open arrangement to facilitate the ingress and egress of a tubular workpiece.
Figure 4:
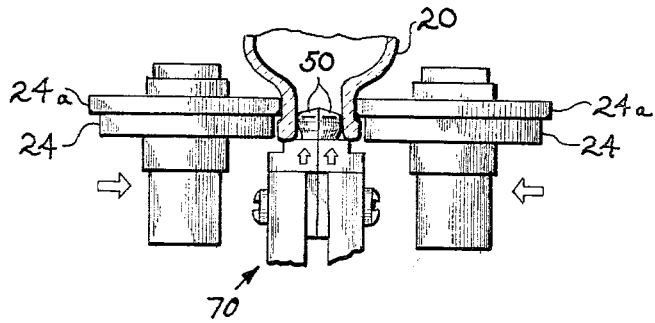
FIG. 4 is a view similar to a portion of FIG. 3 showing the mouth forming apparatus in closed arrangement effecting initial external shaping of the workpiece mouth portion.
Figure 5:
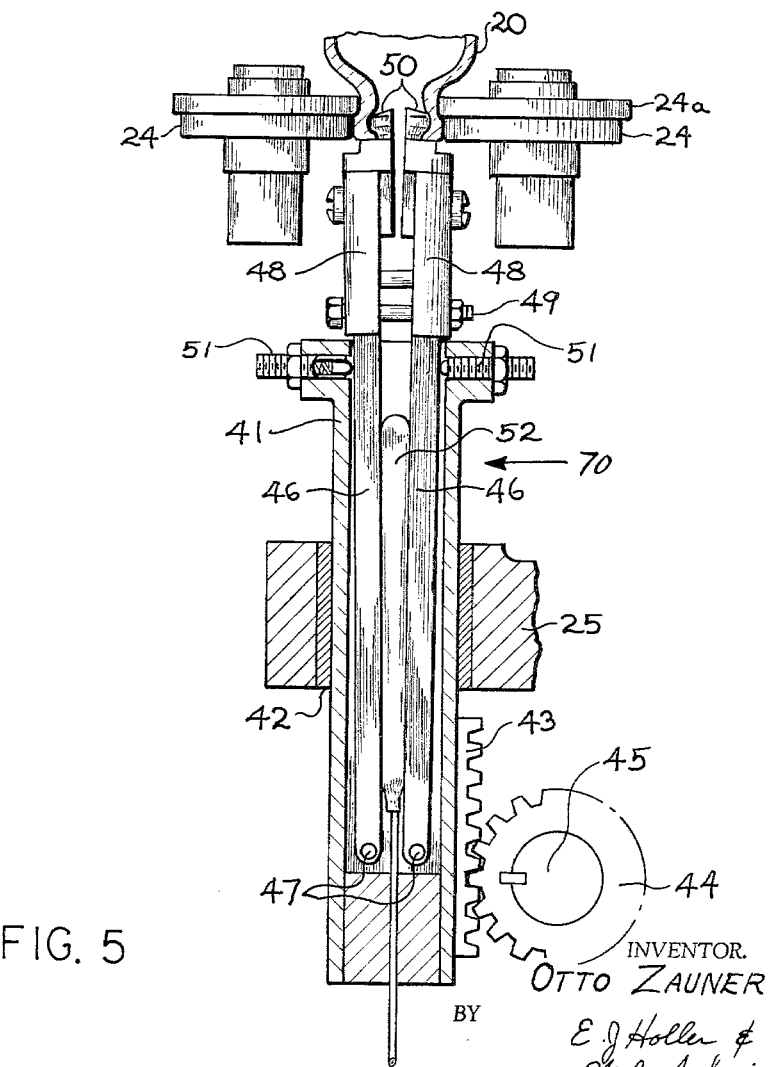
FIG. 5 is a view similar to FIGS. 3 and 4 showing an expansible mandrel portion of the apparatus in expanded arrangement effecting internal shaping of the workpiece mouth portion.

As shown in FIGS. 3, 4 and 5, dies 24 have similar enlarged flanges 24a at an upper region which serve to form the neck configuration and the exterior flange of the tube lower end.

A tension spring 34 is disposed between and interconnects intermediate regions of the two arms 26 as shown in FIGS. 6 and 7. The tension spring is adjustable by a set screw 35 to provide the necessary amount of pressure on the workpiece when dies 24 are brought into engagement therewith by pivotal movement of arms 26 into near relation.

A stop member 36 consisting of a lengthy threaded machine bolt, for example, is mounted in adjustable relation on a free end portion of one arm 26 extending toward the other arm. The projecting end of stop member 36 is adapted to contact the other arm to control the minimal spacing between dies 24.

The terminating free-end portions of each arm 26 have a freely-rotatable cam roller 37 mounted thereon as shown in FIGS. 6 and 7. A beveled cam 38 having working surfaces in the form of a wedge is carried by an arm 39 and is mounted for contacting the pair of cam rollers 37 to separate the free ends of arms 26. Cam supporting arm 39 is fixedly attached to a rocker arm 40 which extends downwardly through base plate 25 into the machine base. Rocker arm 40 is oscillated through a small angle to control the relative position of the forming dies in either open arrangement as shown in FIG. 6 or in closed arrangement as shown in FIG. 7. Rocker arm 40 is rotated in a counter-clockwise direction prior to the interval when the supporting ring 14 moves chuck 16 and its retained workpiece 20 from one work station to another during this interval. Arm 40 is rotated through a small angle from one position to another by a camming mechanism (not shown) which operates in synchronism with and is driven by the table drive mechanism shown in the above-referenced Dichter patent. Cam 38 separates the free end of arms 26 by retraction of cam rollers 37 to facilitate the ingress and egress of the tube stock to and from forming station A. Thus, end forming apparatus 22 is shown with forming dies 24 in open relation in FIG. 6, while FIG. 7 illustrates the dies in closed end forming arrangement.

During end forming with workpiece 20 rotated axially about a stationary vertical axis at station A, rock shaft 40 is rotated clockwise through a small angle and cam 38 is moved from right-to-left permitting bevel cam rollers 37 to be moved into near relation by spring 34 as shown in FIGS. 4 and 7. Forming dies 24 have similar smoothly contoured flanged surfaces. The dies are drawn together by tension spring 34 to constrict the heat-softened end portion until stop member 36 contacts the inner surface of opposite arm member 26. The prescribed stop member 36 accurately controls the external dimension.

A vertically reciprocatable mandrel designated by the numeral 70 is positioned at station A of the forming machine to penetrate the open end portion of tube stock 20. As shown in FIG. 3, the mandrel 70 is maintained in its lowered position to facilitate the ingress of tube stock 20 into its indexed position at station A. Mandrel 70 consists of a cylindrical hollow body portion 41 which is journaled within a suitable bearing 42 in base member 25. Body portion 41 is moved reciprocatably vertically by a rack 43 affixed to its lower region which rack interconnects with a spur gear 44. Spur gear 44 is mounted on a rock shaft 45 which is oscillated through a relatively small angle to raise and lower the mandrel. A pair of lengthy similar arm members 46 is pivotally mounted within hollow body portion 41. Each arm member 46 is pivotally mounted within a lower region of body portion 41 on a horizontal pivot pin 47. Arm members 46 are mounted in spaced-apart vertical alignment within the mandrel body portion.

A pair of semi-circular forming elements 50 is affixed to an upper end of pivoted arms 46. Each forming element 50 is semi-circular in shape having an enlarged upper contour for tooling the internal constricted portion of workpiece 20. Semi-circular forming elements 50 have essentially planar contacting surfaces which reside in face-to-face relation when the mandrel is in its retracted position.

A pair of individual compression springs 51 is mounted in the upper end of mandrel body portion 41 having spring detents which contact an upper region of each arm member 46. The compression springs serve to maintain the pair of forming elements 50 in firmly contacting relation. Elements 51 preferably consist of spring plungers which serve to maintain the two-piece forming tool in contracted relation.

An expansible sleeve 52 of flexible material consisting of a lengthy air-tight finger is disposed between an intermediate region of the pair of pivoted arm members 46. Sleeve 52 is preferably comprised of a glass fiber reinforced silicone rubber coated air sack having a closed upper end and an open lower end. The open lower end interconnects with an inlet line 53 to introduce pressurized air, for example, into sleeve 52 to inflate and deflate this element. Inlet line 53 interconnects with a three-way valve 54 which is operated by a lever 55 and cam roller 56. An inlet line 57 for the introduction of pressurized air interconnects with a pressure regulator 58 and with a T element 59 and an air accumulator 60. When cam 61 mounted on a rotary shaft 62 is turned into proper relation, pressurized air is introduced into finger-like sleeve 52. Rigid arm members 46 which support the pair of separable forming elements 50 are pivoted apart divergently so that forming elements 50 are distended as shown in FIG. 5. The mandrel which is retained in essentially axial alignment with the workpiece at the work station forms the inner surfaces of the mouth portion with a reentrant contour. As shown in FIG. 5 partible forming elements 50 are brought to bear against and form the internal contour. An interconnecting stop member 49 consisting of an adjustable machine bolt limits the expansion of forming elements 50.

Operation of the subject apparatus and method of forming a reentrant internal contour in the mouth portion of glass containers may be summarized as follows:

The tubular glass blank has its lower end portion heated into thermally-softened workable condition at one or more stations disposed immediately ahead of work station A. At these several stations the workpiece is axially rotated by its retention chuck so that the terminating lower region of the end portion is maintained in prescribed horizontal alignment. The tube stock projects downwardly from the chuck in vertical relation to a position on a horizontal plane coincident with the neck and mouth forming surfaces of a pair of rotary forming dies 24. Immediately upon arrival of the tube stock 20 at work station A, the vertically operable mandrel 70 is moved upwardly to penetrate the lower end portion of the tubular blank to a position intermediate of rotary forming dies 24. Wedge shaped cam 38 is then moved right-to-left as shown in FIGS. 6 and 7 a short distance by angular movement of rock shaft 40 with cam rollers 37 being maintained in contact with the angular surfaces of the cam. During this interval the pair of forming dies 24 may be rotated continuously at the same peripheral speed of rotation as the lower end portion of the tube stock, or alternately, be driven by frictional engagement with the workpiece during end constriction. During an initial phase of end constriction the pair of external forming dies 24 reduce the external dimensions of the workpiece and fill a substantial portion of the intervening space between the retracted mandrel forming elements 50 and forming dies 24. As shown in FIG. 4, the enlarged flanges 24a of rotary dies 20 form the external surfaces of the workpiece neck portion while the retracted axially-aligned mandrel serves to lightly contact and maintain the internal surfaces in coaxial alignment.

Immediately subsequent thereto pressurized fluid is introduced into expansible sleeve 52 within the mandrel body portion to separate forming elements 50 disposed within the workpiece. The enlarged upper surfaces of the mandrel forming elements serve to tool the internal surfaces of the container mouth with a reentrant contour in which an inner region has a greater diameter than the diameter at the container lip. Upon forming elements 50 forcing the workable glass outwardly the external flange is formed to essentially its final external contour between rotary forming dies 24 as shown in FIG. 5. Stop member 49 which interconnects an upper region of the pair of arm members limits the expansion of mandrel forming elements 50. Cam 38 is substantially withdrawn from between cam rollers 37 to permit stop member 36 to contact opposing arm 26 to form the external surfaces of the workpiece with precisely formed dimensions. Upon completion of forming the internal "blowback" finish, three-way valve 54 is operated to release the pressurized fluid to air. Spring plungers 51 then force the fluid from the expansible sleeve and contract mandrel elements 50 into retracted relation. The retracted forming elements of the mandrel are then withdrawn from the workpiece by lowering the mandrel 70 by spur gear 44 which meshes with rack 43. Annular cam 38 is then moved from left-to-right to open rotary forming dies 24 and remove them from contact with the workpiece. The lowermost end portion of the workpiece is tooled so that the glass essentially fills the recessed region between the lower portions of forming dies 24 of lesser diameter. Following tooling of the finally-formed container finish with both internal and external surfaces precisely formed, the mandrel is lowered away as stated and external forming dies are separated by cam 38. The external circular forming dies are then fully retracted to permit the tube stock bearing the newly-formed finish to be removed from the work station.

The unfinished glass tube is then further heated and separated at a prescribed intermediate upper region at one or more subsequent stations in accordance with known practice to complete the article formation such as by a bottoming operation. As shown in FIG. 8, the container 20a has an external flange 20b and a precisely-formed constricted neck 20c immediately therebelow. The internal surfaces 20d of the container have a reentrant contour interiorly of flange 20b and above neck 20c. When the container is formed with an essentially right-angled closed bottom 20e the finally formed container as shown in FIG. 8 is completed.

Various modifications may be resorted to within the spirit and scope of the appended claims.

I claim:

1. Apparatus for shaping the neck and mouth portions of a small glass bottle blank in workable condition during its retention at an individual work station of a forming machine, said apparatus comprising, in combination, a chuck for retaining the glass bottle blank, means for axially rotating said chuck and said bottle blank at said work station, a base member mounted in stationary relation at said work station beneath said chuck, a pair of movable arms mounted in pivotal relation on said base member with their free ends projecting near said bottle blank, a pair of circular rotatable forming dies individually mounted in aligned arrangement on said pair of movable arms, means for moving said forming dies into and out of contact with said bottle blank, a forming mandrel having convexly shaped partible working elements mounted on an upper region of said mandrel in axial alignment with said bottle blank, reciprocating means for moving said mandrel into and out of said bottle blank with its working elements intermediate of said forming dies, a flexible expansible member in contacting relation with said partible elements for expanding said forming mandrel within said bottle blank to form the internal surfaces of said mouth portion with a smoothly-concave reentrant contour, means for sequentially controlling admission of pressurized fluid to said flexible member to expand said mandrel and for releasing said fluid from said flexible member, and means for collapsing said flexible member and contracting said mandrel upon release of fluid from said flexible member.

2. The combination in accordance with claim 1, wherein said means for effecting controlled expansion and contraction of said partible working elements of said forming mandrel comprises an expansible air-tight sleeve of flexible material disposed between a pair of pivoted arms each supporting a semi-circular partible working element having an enlarged free-end portion.

3. Glassworking apparatus for forming internal surfaces of the mouth portion of glass containers with reentrant contours comprising a mandrel member having a hollow body portion, a pair of arm members mounted in pivotal relation within said body portion, a pair of semi-circular forming elements individually mounted on the free ends of said arm members in juxtaposed relation projecting from said body portion, an expansible sleeve of flexible material disposed between an intermediate region of said arm members in contacting relation with said arm members, valve means for introducing pressurized fluid into said expansible sleeve to effect expansion of said forming elements and for releasing fluid from said expansible sleeve, spring means for effecting contraction of said forming elements upon release of said pressurized fluid from said sleeve, and limiting means for controlling the maximum expansion of said forming elements.

4. The apparatus as defined in claim 3, wherein said expansible sleeve comprises a lengthy air-tight finger of flexible material disposed between said arm members.

References Cited by the Examiner

UNITED STATES PATENTS

| 646,848 | 4/00 | Lindemeyr | 65—294 XR |
| 744,681 | 11/03 | Ergo | 65—293 |
| 2,565,155 | 8/51 | Westin | 65—260 |
| 2,935,819 | 5/60 | Dichter | 65—227 |

FOREIGN PATENTS

| 15,157 | 8/81 | Germany. |
| 7,306 | 1897 | Great Britain. |

DONALL H. SYLVESTER, *Primary Examiner.*

MORRIS O. WOLK, *Examiner.*